US010846159B2

(12) United States Patent
Arzola et al.

(10) Patent No.: US 10,846,159 B2
(45) Date of Patent: Nov. 24, 2020

(54) SYSTEM AND METHOD FOR MANAGING, RESETTING AND DIAGNOSING FAILURES OF A DEVICE MANAGEMENT BUS

(71) Applicant: Dell Products, L.P., Round Rock, TX (US)

(72) Inventors: Christopher D. Arzola, Round Rock, TX (US); Manjunath Am, Bangalore (IN); Rama Rao Bisa, Bangalore (IN); Kala Sampathkumar, Bangalore (IN); Elie Antoun Jreij, Pflugerville, TX (US); Chitrak Gupta, Bangalore (IN); Komal Dhote, Chhattisgarh (IN); Suresh Vijaykumar, Chennai (IN); Prasanna Kumar Sahoo, Bangalore (IN)

(73) Assignee: Dell Products, L.P., Round Rock, TX (US)

( * ) Notice: Subject to any disclaimer, the term of this patent is extended or adjusted under 35 U.S.C. 154(b) by 211 days.

(21) Appl. No.: 16/171,113

(22) Filed: Oct. 25, 2018

(65) Prior Publication Data

US 2020/0133759 A1    Apr. 30, 2020

(51) Int. Cl.
*G06F 11/00* (2006.01)
*G06F 11/07* (2006.01)
(Continued)

(52) U.S. Cl.
CPC ...... *G06F 11/0745* (2013.01); *G06F 11/0748* (2013.01); *G06F 11/0751* (2013.01);
(Continued)

(58) Field of Classification Search
CPC ............ G06F 11/0745; G06F 11/0748; G06F 11/0751; G06F 11/1441; G06F 11/07;
(Continued)

(56) References Cited

U.S. PATENT DOCUMENTS

| | | | |
|---|---|---|---|
| 2002/0194548 A1* | 12/2002 | Tetreault | G06F 11/0793 714/43 |
| 2004/0162927 A1* | 8/2004 | Benson | G06F 13/387 710/301 |

(Continued)

*Primary Examiner* — Anthony J Amoroso
(74) *Attorney, Agent, or Firm* — Fogarty LLP

(57) ABSTRACT

Embodiments are described for operating a device management bus coupled to a remote access controller and a managed device. The remote access controller detects an inoperable state of the bus and determines a FRU (Field Replaceable Unit) memory is accessible on the managed device. A predefined reset indicator is written to the FRU memory. The managed device monitors for the reset indicator being written to a specified location in FRU memory. Upon detecting the reset indicator in FRU memory, the managed device resets a bus controller coupled to the device management bus and transmits a reset notification on the device management bus. The remote access controller may include an I2C shim that controls access to an I2C multiplexer utilized for transmitting I2C commands from a service processor and an I2C coprocessor, preventing certain inoperable bus states due to concurrent operation of the I2C multiplexer by the I2C coprocessor and the service processor.

14 Claims, 4 Drawing Sheets

(51) Int. Cl.
*G06F 11/14* (2006.01)
*G06F 13/42* (2006.01)

(52) U.S. Cl.
CPC ...... *G06F 11/1441* (2013.01); *G06F 13/4282* (2013.01); *G06F 2213/0016* (2013.01)

(58) Field of Classification Search
CPC ............. G06F 11/0703; G06F 11/0706; G06F 11/1438; G06F 13/4282; G06F 13/1668; G06F 13/1673; G06F 13/42; G06F 13/4204; G06F 13/4208; G06F 13/4221; G06F 13/4234; G06F 13/4247; G06F 13/4265; G06F 2213/0016
See application file for complete search history.

(56) References Cited

U.S. PATENT DOCUMENTS

| | | | |
|---|---|---|---|
| 2004/0162928 A1* | 8/2004 | Benson | G06F 13/4022 710/301 |
| 2005/0060472 A1* | 3/2005 | Mantey | G06F 13/4282 710/305 |
| 2008/0005377 A1* | 1/2008 | Lambert | G06F 11/3041 710/15 |

* cited by examiner

SYSTEM AND METHOD FOR MANAGING, RESETTING AND DIAGNOSING FAILURES OF A DEVICE MANAGEMENT BUS

FIELD

The present disclosure generally relates to Information Handling Systems (IHSs), and, more particularly, to bus communications between components of IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

An IHS may utilize buses to communicate signals, such as transmitting data, between components of the IHS. If a bus connecting two components of the IHS become unavailable, communications between the two components may be completely disabled. In scenarios where a bus becomes inoperable, bus communications may be resumed by restarting the components. However, restarting these components may render them inoperable and may require restarting the IHS. In certain scenarios, such restart requirements may be infeasible. For instance, sideband (i.e., out-of-band) management buses used for monitoring a component may become inoperable, but restarting the monitored component in order to restart such a sideband bus is greatly disfavored in scenarios where such restarts result in downtime of services supported by the component, and potentially the IHS.

SUMMARY

In various embodiments, a system is provided for managing a device management bus coupled to a plurality of managed devices. The system includes: a remote access controller configured to: detect an inoperable state of a device management bus coupling the remote access controller with a first managed device; determine whether a FRU (Field Replaceable Unit) memory is accessible on the first managed device; if the memory is accessible, write a reset indicator to the FRU memory of the first managed device; and monitor the device management bus for a reset notification from the first managed device. The system further includes the first managed device configured to: detect the reset indicator written to the FRU memory; reset a bus controller coupled to the device management bus; and transmit the reset notification on the device management bus.

In additional system embodiments, the remote access controller is further configured to: transmit a plurality of commands to the first managed device via the device management bus; and store a copy of the transmitted commands in a first stack. In additional system embodiments, the remote access controller is further configured to send an error message in response to the detection of the inoperable state of the device management bus, wherein the error message comprises a portion of the commands from the first stack. In additional system embodiments, the remote access controller is further configured to: monitor for responses to the transmitted commands from the first managed device; identify the transmitted commands in the first stack for which no response has been received; and store the commands with no response to a second stack. In additional system embodiments, the error message includes the transmitted commands from the second stack. In additional system embodiments, the FRU memory is accessed via the device management bus. In additional system embodiments, the reset indicator is written to a predefined location in the FRU memory.

In various additional embodiments, an I2C controller includes a shim controlling access to an I2C multiplexer, wherein the shim is configured to: create a first set of buffers and a second set of buffers for storing received I2C messages; store I2C messages received from a service processor in the first set of buffers; store I2C messages generated by the I2C controller in the second set of buffers; monitor for an interrupt indicating receipt of I2C message from the service processor; if the second set of buffers indicates the I2C multiplexer is not in use by the I2C controller and the I2C message is stored in the first set of buffers, switch the multiplexer for use to transmit the I2C message on behalf of the service processor; and if the I2C multiplexer is in use by the I2C controller, maintain the multiplexer for use by the I2C controller.

In additional I2C controller embodiments, each buffer comprises a status byte indicating the status of the messages stored in the respective buffer. In additional system embodiments, the status byte indicates whether processing has been completed for the message stored in a buffer. In additional system embodiments, the status byte indicates whether the message stored in a buffer is currently being processed. In additional system embodiments, the status byte indicates whether the buffer stores a message ready for processing. In additional system embodiments, the status byte indicates whether the buffer is available for use.

In various additional embodiments, a method is provided for managing a device management bus coupled to a plurality of managed devices. The method includes: detecting an inoperable state of a device management bus coupling a remote access controller with a first managed device; determining whether a FRU memory is accessible on the first managed device; writing a reset indicator to the FRU memory of the first managed device; monitoring the device management bus for a reset notification from the first managed device; detecting, by the first managed device, the reset indicator written to the FRU memory; and resetting a bus controller coupled to the device management bus in response to detecting the reset indicator in the FRU memory.

In additional embodiments, the method further includes transmitting a plurality of commands to the first managed device via the device management bus; and storing a copy of the transmitted commands in a first stack. In additional embodiments, the method further includes sending an error message in response to the detection of the inoperable state of the device management bus, wherein the error message includes a portion of the transmitted commands from the first stack. In additional embodiments, the method further includes monitoring for responses to the transmitted commands from the first managed device; identifying the transmitted commands in the first stack for which no response has been received; and storing the commands with no response to a second stack. In additional method embodiments, the error message includes a portion of the transmitted commands from the second stack. In additional method embodiments, the FRU memory is accessed via the device management bus. In additional method embodiments, the reset indicator is written to a predefined location in the FRU memory.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Remote management of IHSs supports the centralized administration of virtualized systems that are configured from these remotely managed IHSs. Remote management of an IHS may be implemented using components such as the remote access controller described herein that monitors various aspects of the operation of the IHS. Such monitoring may be implemented using sideband bus communications between the remote access controller and components of the IHS being managed by the remote access controller. Periods of interoperability of such sideband buses may prevent effective management of the IHS by the remote access controller. Embodiments described herein avoid periods of prolonged inoperability of such sideband buses and provide techniques for recovering the sideband bus without resetting the managed components or the IHS.

Figure 1:
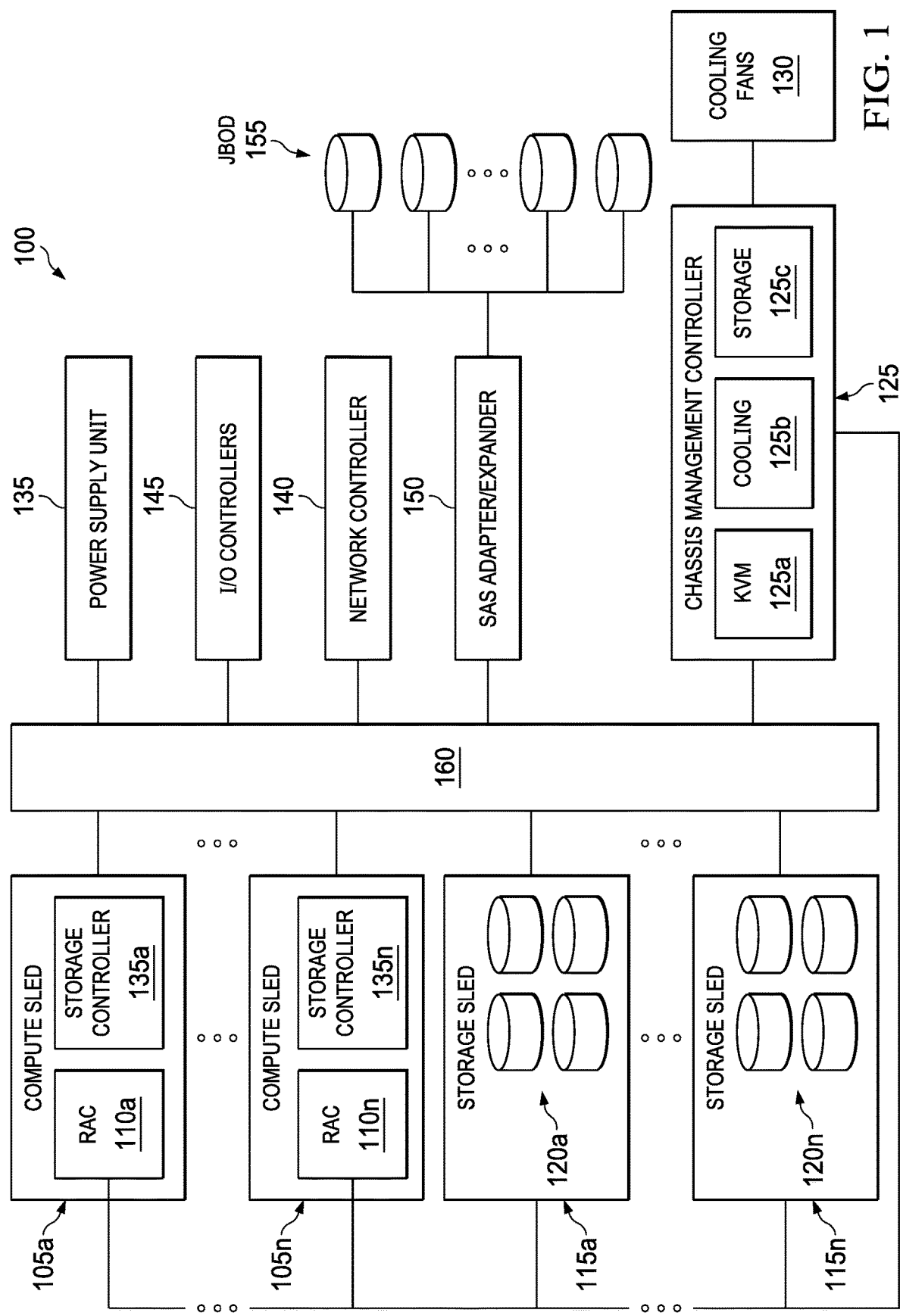
FIG. 1 is a diagram illustrating certain components of a chassis, according to some embodiments, for managing, resetting and diagnosing failures of a device management bus.

FIG. 1 is a block diagram illustrating certain components of a chassis 100 comprising one or more compute sleds 105a-n and one or more storage sleds 115a-n that may be configured to implement the systems and methods described herein. Chassis 100 may include one or more bays that each receive an individual sled (that may be additionally or alternatively referred to as a tray, blade, and/or node), such as compute sleds 105a-n and storage sleds 115a-n. Chassis 100 may support a variety of different numbers (e.g., 4, 8, 16, 32), sizes (e.g., single-width, double-width) and physical configurations of bays. Other embodiments may include additional types of sleds that provide various types of storage and/or processing capabilities. Other types of sleds may provide power management and networking functions. Sleds may be individually installed and removed from the chassis 100, thus allowing the computing and storage capabilities of a chassis to be reconfigured by swapping the sleds with different types of sleds, in many cases without affecting the operations of the other sleds installed in the chassis 100.

Multiple chassis 100 may be housed within a rack. Data centers may utilize large numbers of racks, with various different types of chassis installed in the various configurations of racks. The modular architecture provided by the sleds, chassis and rack allow for certain resources, such as cooling, power and network bandwidth, to be shared by the compute sleds 105a-n and the storage sleds 115a-n, thus providing efficiency improvements and supporting greater computational loads.

Chassis 100 may be installed within a rack structure that provides all or part of the cooling utilized by chassis 100. For airflow cooling, a rack may include one or more banks of cooling fans that may be operated to ventilate heated air from within the chassis 100 that is housed within the rack. The chassis 100 may alternatively or additionally include one or more cooling fans 130 that may be similarly operated to ventilate heated air from within the sleds 105a-n, 115a-n installed within the chassis. A rack and a chassis 100 installed within the rack may utilize various configurations and combinations of cooling fans to cool the sleds 105a-n, 115a-n and other components housed within chassis 100.

The sleds 105a-n, 115a-n may be individually coupled to chassis 100 via connectors that correspond to the bays provided by the chassis 100 and that physically and electrically couple an individual sled to a backplane 160. Chassis backplane 160 may be a printed circuit board that includes electrical traces and connectors that are configured to route signals between the various components of chassis 100 that are connected to the backplane 160. In various embodiments, backplane 160 may include various additional components, such as cables, wires, midplanes, backplanes, connectors, expansion slots, and multiplexers. In certain embodiments, backplane 160 may be a motherboard that includes various electronic components installed thereon. Such components installed on a motherboard backplane 160 may include components that implement all or part of the functions described with regard to the SAS (Serial Attached SCSI) expander 150, I/O controllers 145, network controller 140 and power supply unit 135.

Figure 2:
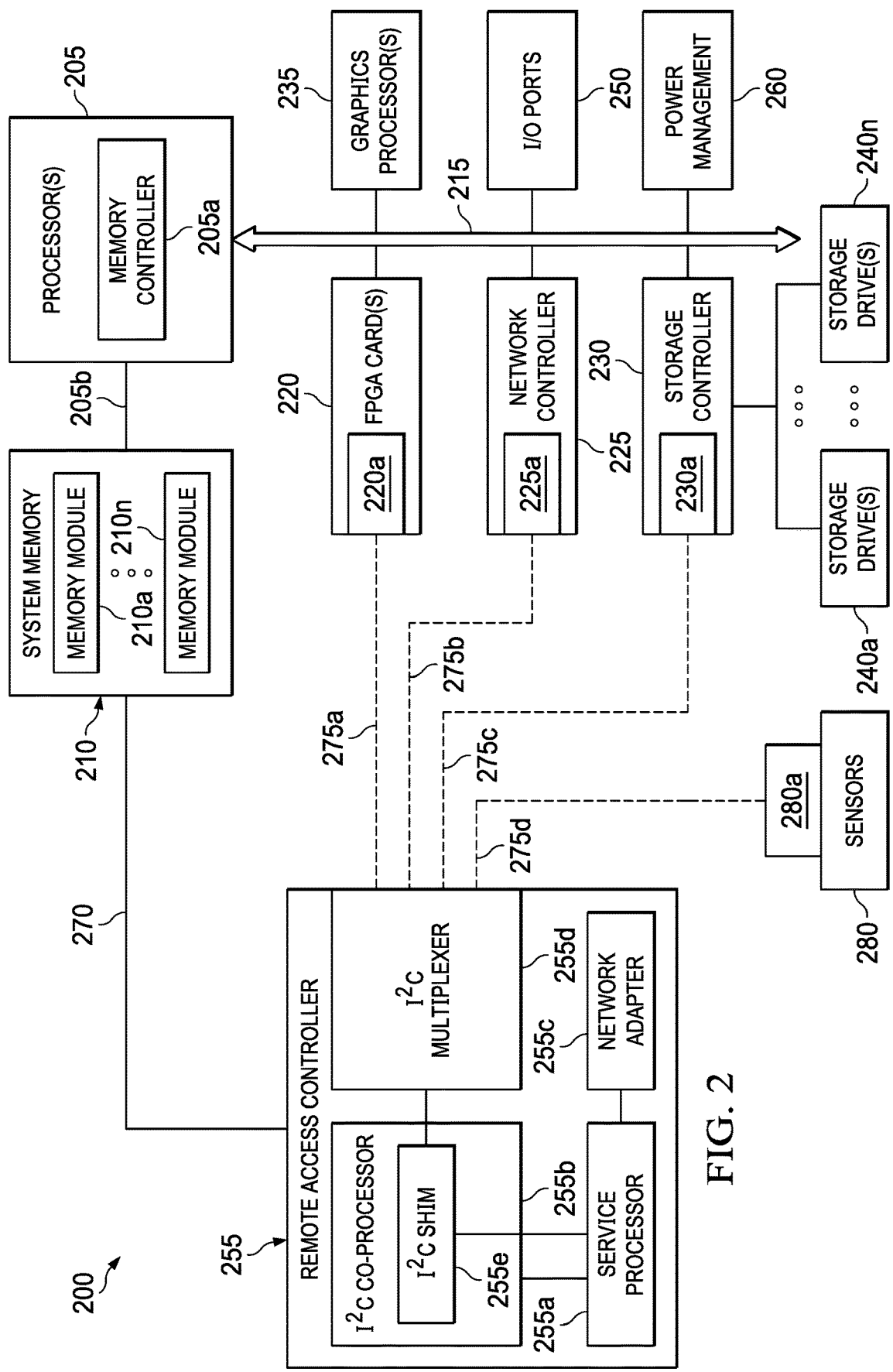
FIG. 2 is a diagram illustrating certain components of an IHS configured as a component of chassis, according to some embodiments, for managing, resetting and diagnosing failures of a device management bus.

In certain embodiments, a compute sled 105a-n may be an IHS such as described with regard to IHS 200 of FIG. 2. A compute sled 105a-n may provide computational processing resources that may be used to support a variety of e-commerce, multimedia, business and scientific computing applications, such as services provided via a cloud implementation. Compute sleds 105a-n are typically configured with hardware and software that provide leading-edge computational capabilities. Accordingly, services provided using such computing capabilities are typically provided as high-availability systems that operate with minimum downtime. As described in additional detail with regard to FIG. 2, compute sleds 105a-n may be configured for general-purpose computing or may be optimized for specific computing tasks.

As illustrated, each compute sled 105a-n includes a remote access controller (RAC) 110a-n. As described in additional detail with regard to FIG. 2, remote access controller 110a-n provides capabilities for remote monitoring and management of compute sled 105a-n. In support of these monitoring and management functions, remote access controllers 110*a-n* may utilize both in-band and sideband (i.e., out-of-band) communications with various components of a compute sled 105*a-n* and chassis 100. Remote access controller 110*a-n* may collect sensor data, such as temperature sensor readings, from components of the chassis 100 in support of airflow cooling of the chassis 100 and the sleds 105*a-n*, 115*a-n*. In addition, each remote access controller 110*a-n* may implement various monitoring and administrative functions related to compute sleds 105*a-n* that require sideband bus connections with various internal components of the respective compute sleds 105*a-n*. As described in additional detail with regard to FIG. 3, management functions of the remote access controllers 110*a-n* may be compromised based on failures of such sideband bus connections.

As illustrated, chassis 100 also includes one or more storage sleds 115*a-n* that are coupled to the backplane 160 and installed within one or more bays of chassis 200 in a similar manner to compute sleds 105*a-n*. Each of the individual storage sleds 115*a-n* may include various numbers and types of storage devices. For instance, storage sleds 115*a-n* may include SAS (Serial Attached SCSI) magnetic disk drives, SATA (Serial Advanced Technology Attachment) magnetic disk drives, solid-state drives (SSDs) and other types of storage drives in various combinations. The storage sleds 115*a-n* may be utilized in various storage configurations by the compute sleds 105*a-n* that are coupled to chassis 100.

Each of the compute sleds 105*a-n* includes a storage controller 135*a-n* that may be utilized to access storage drives that are accessible via chassis 100. Some of the individual storage controllers 135*a-n* may provide support for RAID (Redundant Array of Independent Disks) configurations of logical and physical storage drives, such as storage drives provided by storage sleds 115*a-n*. In some embodiments, some or all of the individual storage controllers 135*a-n* may be HBAs (Host Bus Adapters) that provide more limited capabilities in accessing physical storage drives provided via storage sleds 115*a-n* and/or via SAS expander 150.

In addition to the data storage capabilities provided by storage sleds 115*a-n*, chassis 100 may provide access to other storage resources that may be installed as components of chassis 100 and/or may be installed elsewhere within a rack housing the chassis 100, such as within a storage blade. In certain scenarios, such storage resources 155 may be accessed via a SAS expander 150 that is coupled to the backplane 160 of the chassis 100. The SAS expander 150 may support connections to a number of JBOD (Just a Bunch Of Disks) storage drives 155 that may be configured and managed individually and without implementing data redundancy across the various drives 155. The additional storage resources 155 may also be at various other locations within a datacenter in which chassis 100 is installed. Such additional storage resources 155 may also may be remotely located.

As illustrated, the chassis 100 of FIG. 1 includes a network controller 140 that provides network access to the sleds 105*a-n*, 115*a-n* installed within the chassis. Network controller 140 may include various switches, adapters, controllers and couplings used to connect chassis 100 to a network, either directly or via additional networking components and connections provided via a rack in which chassis 100 is installed. Chassis 100 may similarly include a power supply unit 135 that provides the components of the chassis with various levels of DC power from an AC power source or from power delivered via a power system provided by a rack within which chassis 100 may be installed. In certain embodiments, power supply unit 135 may be implemented within a sled that may installed similar sleds 105*a-n*, 115*a-n* to provide chassis 100 with redundant, hot-swappable power supply units.

Chassis 100 may also include various I/O controllers 140 that may support various I/O ports, such as USB ports that may be used to support keyboard and mouse inputs and/or video display capabilities. Such I/O controllers 145 may be utilized by the chassis management controller 125 to support various KVM (Keyboard, Video and Mouse) 125*a* capabilities that provide administrators with the ability to interface with the chassis 100. The chassis management controller 125 may also include a storage module 125*c* that provides capabilities for managing and configuring certain aspects of the storage devices of chassis 100, such as the storage devices provided within storage sleds 115*a-n* and within the JBOD 155.

In addition to providing support for KVM 125*a* capabilities for administering chassis 100, chassis management controller 125 may support various additional functions for sharing the infrastructure resources of chassis 100. In some scenarios, chassis management controller 125 may implement tools for managing the power 135, network bandwidth 140 and airflow cooling 130 that are available via the chassis 100. As described, the airflow cooling 130 utilized by chassis 100 may include an airflow cooling system that is provided by a rack in which the chassis 100 may be installed and managed by a cooling module 125*b* of the chassis management controller 125.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. As described, an IHS may also include one or more buses operable to transmit communications between the various hardware components. An example of an IHS is described in more detail below.

FIG. 2 shows an example of an IHS 200 configured to implement systems and methods described herein. It should be appreciated that although the embodiments described herein may describe an IHS that is a compute sled or similar computing component that may be deployed within the bays of a chassis, other embodiments may be utilized with other types of IHSs. In the illustrative embodiment of FIG. 2, IHS 200 may be a computing component, such as compute sled 105*a-n*, that is configured to share infrastructure resources provided by a chassis 100.

The IHS 200 of FIG. 2 may be a compute sled, such as compute sleds 105*a-n* of FIG. 1, that may be installed within a chassis, that may in turn be installed within a rack.

Installed in this manner, IHS 200 may utilized shared power, network and cooling resources provided by the chassis and/or rack. IHS 200 may utilize one or more processors 205. In some embodiments, processors 205 may include a main processor and a co-processor, each of which may include a plurality of processing cores that, in certain scenarios, may each be used to run an instance of a server process. In certain embodiments, one or all of processor(s) 205 may be graphics processing units (GPUs) in scenarios where IHS 200 has been configured to support functions such as multimedia services and graphics applications.

As illustrated, processor(s) 205 includes an integrated memory controller 205a that may be implemented directly within the circuitry of the processor 205, or the memory controller 205a may be a separate integrated circuit that is located on the same die as the processor 205. The memory controller 205a may be configured to manage the transfer of data to and from the system memory 210 of the IHS 205 via a high-speed memory interface 205b.

The system memory 210 is coupled to processor(s) 205 via a memory bus 205b that provides the processor(s) 205 with high-speed memory used in the execution of computer program instructions by the processor(s) 205. Accordingly, system memory 210 may include memory components, such as such as static RAM (SRAM), dynamic RAM (DRAM), NAND Flash memory, suitable for supporting high-speed memory operations by the processor(s) 205. In certain embodiments, system memory 210 may combine both persistent, non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty components. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each processor 205. All or portions of the chipset may be implemented directly within the integrated circuitry of an individual processor 205. The chipset may provide the processor(s) 205 with access to a variety of resources accessible via one or more buses 215. Various embodiments may utilize any number of buses to provide the illustrated pathways served by bus 215. In certain embodiments, bus 215 may include a PCIe (PCI Express) switch fabric that is accessed via a PCIe root complex. IHS 200 may also include one or more I/O ports 250, such as PCIe ports, that may be used to couple the IHS 200 directly to other IHSs, storage resources or other peripheral components.

As illustrated, a variety of resources may be coupled to the processor(s) 205 of the IHS 200 via bus 215. For instance, processor(s) 205 may be coupled to a network controller 225, such as provided by a Network Interface Controller (NIC) that is coupled to the IHS 200 and allows the IHS 200 to communicate via an external network, such as the Internet or a LAN. Processor(s) 205 may also be coupled to a power management unit 260 that may interface with the power system unit 135 of the chassis 100 in which an IHS, such as a compute sled, may be installed. In certain embodiments, a graphics processor 235 may be comprised within one or more video or graphics cards, or an embedded controller, installed as components of the IHS 200. In certain embodiments, graphics processor 235 may be an integrated of the remote access controller 255 and may be utilized to support the display of diagnostic and administrative interfaces related to IHS 200 via display devices that are coupled, either directly or remotely, to remote access controller 255.

As illustrated, IHS 200 may include one or more FPGA (Field-Programmable Gate Array) card(s) 220. Each of the FPGA card 220 supported by IHS 200 may include various processing and memory resources, in addition to an FPGA integrated circuit that may be reconfigured after deployment of IHS 200 through programming functions supported by the FPGA card 220. Each individual FGPA card 220 may be optimized to perform specific processing tasks, such as specific signal processing, security, data mining, and artificial intelligence functions, and/or to support specific hardware coupled to IHS 200.

In certain embodiments, IHS 200 may operate using a BIOS (Basic Input/Output System) that may be stored in a non-volatile memory accessible by the processor(s) 205. The BIOS may provide an abstraction layer by which the operating system of the IHS 200 interfaces with the hardware components of the IHS. Upon powering or restarting IHS 200, processor(s) 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for use by the IHS 200. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 255.

In certain embodiments, remote access controller 255 may operate from a different power plane from the processors 205 and other components of IHS 200, thus allowing the remote access controller 255 to operate, and management tasks to proceed, while the processing cores of IHS 200 are powered off. As described, various functions provided by the BIOS, including launching the operating system of the IHS 200, may be implemented by the remote access controller 255. In some embodiments, the remote access controller 255 may perform various functions to verify the integrity of the IHS 200 and its hardware components prior to initialization of the IHS 200 (i.e., in a bare-metal state).

Remote access controller 255 may include a service processor 255a, or specialized microcontroller, that operates management software that supports remote monitoring and administration of IHS 200. Remote access controller 255 may be installed on the motherboard of IHS 200 or may be coupled to IHS 200 via an expansion slot provided by the motherboard. In support of remote monitoring functions, network adapter 225c may support connections with remote access controller 255 using wired and/or wireless network connections via a variety of network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 255 may support monitoring and administration of various managed devices 220, 225, 230, 280 of an IHS via a sideband bus interface. For instance, messages utilized in device management may be transmitted using I2C sideband bus connections 275a-d that may be individually established with each of the respective managed devices 220, 225, 230, 280 through the operation of an I2C multiplexer 255d of the remote access controller. As illustrated, certain of the managed devices of IHS 200, such as FPGA cards 220, network controller 225 and storage controller 230, are coupled to the IHS processor(s) 205 via an in-line bus 215, such as a PCIe root complex, that is separate from the I2C sideband bus connections 275a-d used for device management. The management functions of the remote access controller 255 may utilize information collected by various managed sensors 280 located within the IHS. For instance, temperature data collected by sensors 280 may be utilized by the remote access controller 255 in support of closed-loop airflow cooling of the IHS 200.

In certain embodiments, the service processor 255a of remote access controller 255 may rely on an I2C co-processor 255b to implement sideband I2C communications between the remote access controller 255 and managed components 220, 225, 230, 280 of the IHS. The I2C co-processor 255b may be a specialized co-processor or microcontroller that is configured to interface via a sideband I2C bus interface with the managed hardware components 220, 225, 230, 280 of IHS. In some embodiments, the I2C co-processor 255b may be an integrated component of the service processor 255a, such as a peripheral system-on-chip feature that may be provided by the service processor 255a. Each I2C bus 275a-d is illustrated as single line in FIG. 2. However, each I2C bus 275a-d may be comprised of a clock line and data line that couple the remote access controller 255 to I2C endpoints 220a, 225a, 230a, 280a that may each be designated as field replaceable units (FRUs).

As illustrated, the I2C co-processor 255b may interface with the individual managed devices 220, 225, 230, 280 via individual sideband I2C bus segments 275a-d selected through the operation of an I2C multiplexer 255d. Via switching operations by the I2C multiplexer 255d, a sideband bus connection 275a-d may be established via a direct coupling between the I2C co-processor 255b and an individual managed device 220, 225, 230, 280.

As illustrated, the I2C coprocessor 255b includes an I2C shim 255e that is coupled to the service processor 255a. As described in additional detail with regard to FIG. 4, the I2C shim 255e may be configured to interface with the I2C multiplexer 255d in managing and processing the I2C transactions requested by the service processor 255a and by the I2C coprocessor 255b. The service processor 255a may rely on the I2C coprocessor 255b for processing and management of certain I2C functions. However, for certain I2C functions, especially more straightforward functions for which there is no benefit in offloading, a service processor 255a may be configured to interface directly with the I2C multiplexer 255d. In such scenarios, both the service processor 255a and the I2C coprocessor 255b may each attempt to initiate an I2C transaction while an I2C transaction is currently being processed by the other component. As described in additional detail with regard to FIG. 4, the I2C shim 255e may be configured to broker access to the I2C multiplexer 255d while preventing multiple components from attempting to operate the I2C multiplexer 255d simultaneously.

In providing sideband management capabilities, the I2C co-processor 255b may each interoperate with corresponding endpoint I2C controllers 220a, 225a, 230a, 280a that implement the I2C communications of the respective managed devices 220, 225, 230. The endpoint I2C controllers 220a, 225a, 230a, 280a may be implemented as a dedicated microcontroller for communicating sideband I2C messages with the remote access controller 255, or endpoint I2C controllers 220a, 225a, 230a, 280a may be integrated SoC functions of a processor of the respective managed device endpoints 220, 225, 230, 280.

As described, each of the managed device endpoints 220, 225, 230, 280 may be regarded as FRUs (Field Replaceable Units) in compliance with the Intelligent Platform Management Interface. Accordingly, each of the managed device endpoints 220, 225, 230, 280 may include a FRU memory, such as an EEPROM (electrically erasable programmable read-only memory), that stores descriptive information about the device, such as its manufacturer, serial number and part number. Each of the managed device endpoints 220, 225, 230, 280 may include a FRU memory including information about the respective managed device. Each managed device may include various subcomponents, such as endpoint I2C controllers 220a, 225a, 230a, 280a, that may similarly each include a FRU memory. As described in additional detail with regard to FIG. 3, such FRU memory locations may be used to transmit bus notifications in order to trigger reset of the sideband management buses 275a-d.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
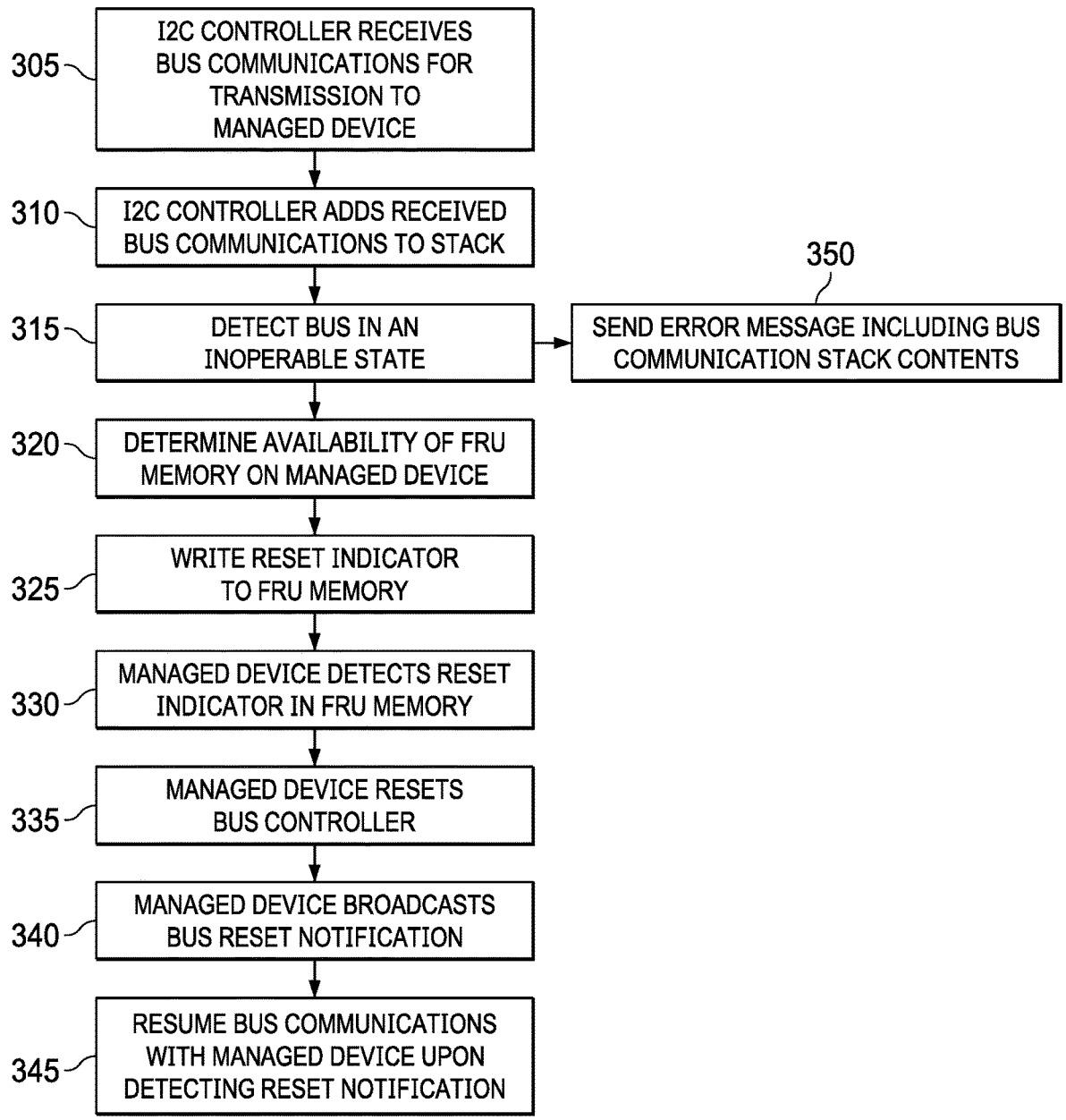
FIG. 3 is a flowchart describing certain steps of a method, according to some embodiments, for diagnosing failures and resetting of a device management bus.

FIG. 3 is a flowchart describing certain steps of a method, according to some embodiments, for diagnosing failures and resetting a device management bus. As described with regard to FIG. 2, a remote access controller may rely on an I2C controller for processing and management of certain I2C transactions, such as device management messages transmitted to managed devices that are I2C endpoints. In such a scenario, at block 305, an I2C controller receives I2C messages for transmission to managed I2C endpoint devices.

Each of the I2C bus segments that are coupled to individual I2C endpoint devices may become inoperable due to a variety of causes, both known and unknown. Diagnosing and repairing the causes of bus failures is complicated by lack of information regarding the I2C transactions being conducted at the time of the bus failure. In diagnosing some failures, technicians resort to utilizing diagnostic probes to monitor bus traffic while attempting to re-create bus failures in order to identify the transactions being processed during the bus failure.

Accordingly, at block 310, the I2C controller may maintain a stack of recent I2C transactions. In particular, the I2C controller may maintain a stack, such as a size-limited FIFO queue, of I2C messages received for transmission to managed endpoint devices. For example, a stack may record the most recent twenty-five I2C messages received for transmission by the I2C controller. In some embodiments, the I2C controller may maintain one or more additional stacks of various categories of I2C transactions. For instance, an I2C controller may maintain a similar size-limited stack of the most recent I2C transactions for which a command has been issued to a managed I2C endpoint device, but a response is yet to be received. In this manner, the I2C controller may maintain separate stacks for tracking the most recent and the pending transactions on each individual I2C bus segment.

At block 315, the I2C controller determines that one or more of the I2C bus segments are inoperable, at least with regard to device management messaging. At 350, the I2C controller may generate an error message that provides notification of the operable bus. The error message may also include the I2C message information maintained in each of the relevant stacks maintained by the I2C controller. For instance, the error message may include most recent I2C messages transmitted on the inoperable bus segment, and/or may include the most recent I2C messages for which no response has been received from a managed device endpoint.

In addition to providing diagnostic information maintained in the I2C transaction stacks, the I2C controller may be configured to reset the inoperable I2C bus segment. In such embodiments, at block 320, the I2C controller may determine whether a communication pathway remains available for accessing a FRU memory on the managed device that corresponds to the inoperable I2C bus segment. As described, a managed device may be identified based on information stored in a FRU memory. In certain embodiments, such FRU memory may include capabilities for additional storage that is available for system use. If such a FRU memory is available, at block 325, the I2C controller may issue a bus transaction by which a predefined value, such as a particular binary value, is written to a specific location in the FRU memory, thus serving to transmit a reset indicator to the managed device.

In certain embodiments, a bus controller of the managed device, such as endpoint I2C controllers 220a, 225a, 230a, 280a of FIG. 2, may each include a FRU memory and the respective I2C controllers may be configured to monitor for the predefined reset indicator having been written to a particular location in the FRU memory. In certain embodiments, the FRU memory used to transmit a reset indicator may be a FRU memory of the managed device itself, rather than of the bus controller. In response to detecting, at step 330, the reset indicator at a specific FRU address, at block 335, the I2C bus controller of the managed device is reset. At block 340, the managed device broadcasts a reset notification on the I2C bus segment. Upon detection of this reset notification, at 345, the I2C controller resumes communications with the managed device via the I2C bus.

Figure 4:
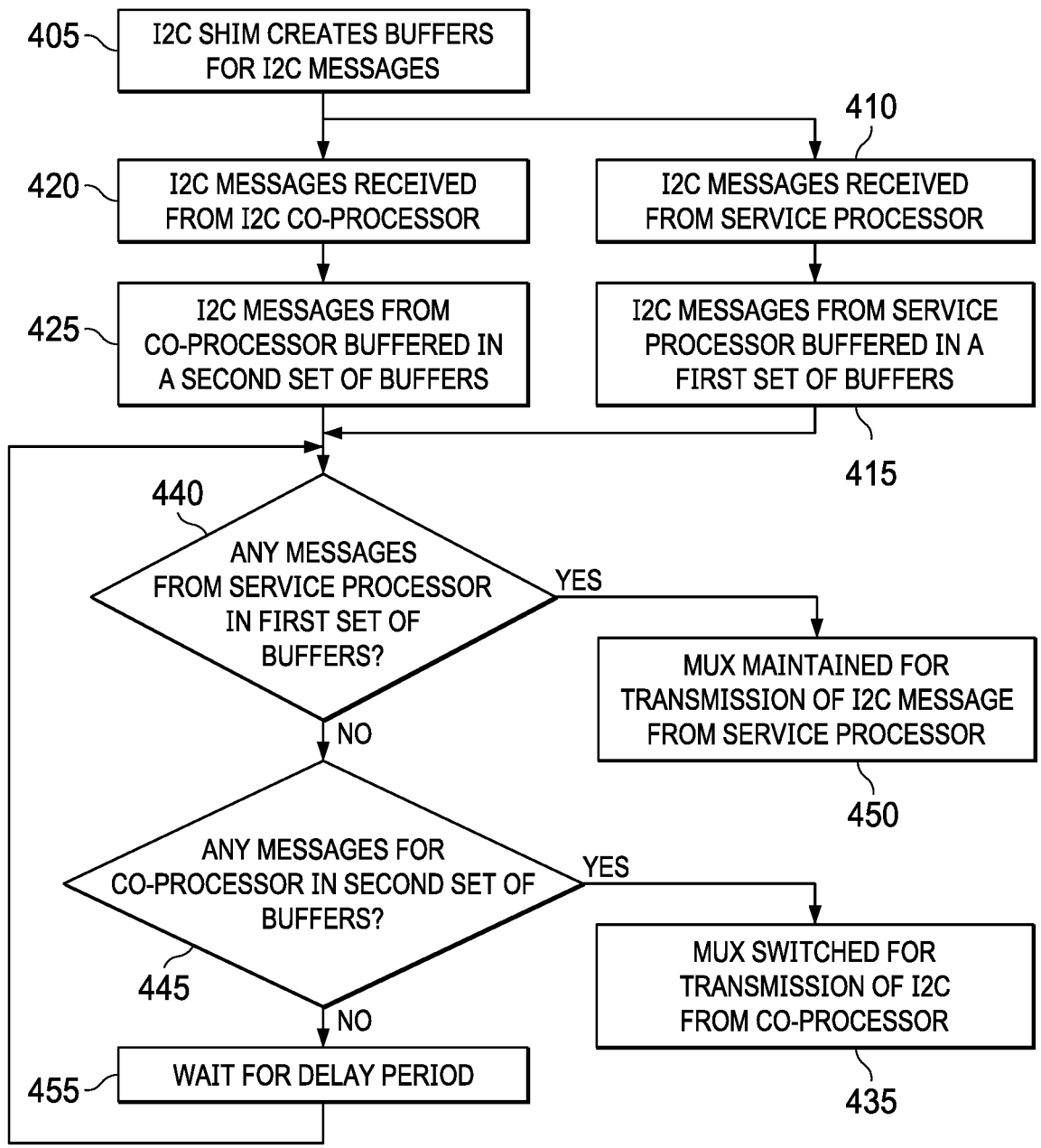
FIG. 4 is a flowchart describing certain steps of a method, according to some embodiments, for managing transactions on a device management bus.

FIG. 4 is a flowchart describing certain steps of a method, according to some embodiments, for managing transactions on a device management bus. As described with regard to FIG. 2, an I2C coprocessor may include an I2C shim that manages access to the I2C multiplexer on behalf of the I2C coprocessor and the service processor, which may be configured to process certain types of I2C transactions directly rather than offloading them to the I2C coprocessor. In support of this capability, at block 405, the I2C shim creates two sets of buffers for use in storing the I2C messages received from the I2C coprocessor and the service processor.

One set of buffers created by the I2C shim is designated for I2C messages received from the service processor and another set of buffers is designated for I2C messages from the I2C coprocessor. Accordingly, at block 410, the I2C shim receives an I2C message from the service processor, and a block 415, these messages are stored in the buffers designated for messages from the service processor. Similarly, at block 420, the I2C shim receives I2C message from the I2C coprocessor, and at block 425 these messages are stored in buffers designated for the I2C coprocessor.

Embodiments may utilize timed interrupts to trigger status checks for both set of buffers. If messages are present in these buffers, the messages may then be transmitted for delivery to a managed I2C endpoint device. In some embodiments, each individual buffer may be associated with a status byte that may be maintained as a header that indicates status information for the respective buffer. The status byte may indicate various states for an individual buffer. For instance, a status byte may specify that the message stored in in an individual buffer has been processed, the message in the buffer corresponds to an ongoing operation, the buffer has an I2C message ready for transmission, or the buffer is empty.

As described, buffers are maintained in two sets: one set for transactions for the service processor, and the set other for transactions for the I2C coprocessor. Based on the status bytes for the buffers in the set designated for the service processor, at block 440, the I2C shim determines whether any messages are ready for transmission on behalf of the service processor. If the status bytes for any of the service processor set of buffers indicate that messages are ready for transmission in any of these buffers, at block 450, the I2C shim switches the I2C multiplexer for transactions by the service processor and initiates the transmission of all messages in the service processor set of buffers that are ready for transmission. The I2C shim may update the status bytes for these buffers accordingly in order to indicate when the transaction remains pending and when the transaction has been completed.

If, at block 440, no messages are waiting for transmission on behalf of the service coprocessor, at block 445, the I2C shim determines whether any messages are ready for transmission on behalf of the I2C coprocessor. If the status bytes for any of the I2C coprocessor set of buffers indicate that messages are ready for transmission in any of these buffers, at block 435, the I2C shim switches the I2C multiplexer for transactions by the I2C coprocessor and initiates the transmission of all such messages. The I2C shim may update these status bytes for these buffers accordingly. If no messages are ready for transmission in either set of buffers, at block 455, the process waits until the next interrupt interval to determine whether new transactions have been received in the buffers.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system for managing a device management bus coupled to a plurality of managed devices, the system comprising:
   a remote access controller configured to:
      detect an inoperable state of a device management bus coupling the remote access controller with a first managed device;
      determine whether a FRU (Field Replaceable Unit) memory is accessible on the first managed device;
      if the memory is accessible, write a reset indicator to the FRU memory of the first managed device; and
      monitor the device management bus for a reset notification from the first managed device; and
   the first managed device configured to:
      detect the reset indicator written to the FRU memory;
      reset a bus controller coupled to the device management bus; and
      transmit the reset notification on the device management bus.

2. The system of claim 1, wherein the remote access controller is further configured to:
   transmit a plurality of commands to the first managed device via the device management bus; and
   store a copy of the transmitted commands in a first stack.

3. The system of claim 2, wherein the remote access controller is further configured to send an error message in response to the detection of the inoperable state of the device management bus, wherein the error message comprises a portion of the commands from the first stack.

4. The system of claim 3, wherein the remote access controller is further configured to:
   monitor for responses to the transmitted commands from the first managed device;
   identify the transmitted commands in the first stack for which no response has been received; and
   store the commands with no response to a second stack.

5. The system of claim 4, wherein the error message includes the transmitted commands from the second stack.

6. The system of claim 1, wherein the FRU memory is accessed via the device management bus.

7. The system of claim 6, wherein the reset indicator is written to a predefined location in the FRU memory.

8. A method for managing a device management bus coupled to a plurality of managed devices, the method comprising:
   detecting an inoperable state of a device management bus coupling a remote access controller with a first managed device;
   determining whether a FRU memory is accessible on the first managed device;
   writing a reset indicator to the FRU memory of the first managed device;
   monitoring the device management bus for a reset notification from the first managed device;
   detecting, by the first managed device, the reset indicator written to the FRU memory; and
   resetting, by the first managed device, a bus controller coupled to the device management bus in response to detecting the reset indicator in the FRU memory.

9. The method of claim 8, further comprising:
transmitting a plurality of commands to the first managed device via the device management bus; and
storing a copy of the transmitted commands in a first stack.

10. The method of claim 9, further comprising:
sending an error message in response to the detection of the inoperable state of the device management bus, wherein the error message includes a portion of the transmitted commands from the first stack.

11. The method of claim 10, further comprising:
monitoring for responses to the transmitted commands from the first managed device;
identifying the transmitted commands in the first stack for which no response has been received; and
storing the commands with no response to a second stack.

12. The method of claim 11, wherein the error message includes a portion of the transmitted commands from the second stack.

13. The method of claim 8, wherein the FRU memory is accessed via the device management bus.

14. The method of claim 13, wherein the reset indicator is written to a predefined location in the FRU memory.

* * * * *